(12) United States Patent
Bao et al.

(10) Patent No.: US 10,380,615 B2
(45) Date of Patent: Aug. 13, 2019

(54) PRODUCT DESIGN BASED ON USER REVIEWS

(71) Applicant: International Business Machines Corporation, Armonk, NY (US)

(72) Inventors: Sheng Hua Bao, San Jose, CA (US); Keke Cai, Beijing (CN); Dong Xu Duan, Beijing (CN); HongLei Guo, Beijing (CN); Changhua Sun, Beijing (CN); Li Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 14/837,376

(22) Filed: Aug. 27, 2015

(65) Prior Publication Data

US 2017/0061454 A1     Mar. 2, 2017

(51) Int. Cl.
*G06Q 30/02* (2012.01)

(52) U.S. Cl.
CPC ................. *G06Q 30/0203* (2013.01)

(58) Field of Classification Search
CPC ......... G06Q 10/00; G06Q 10/06; G06F 17/60
USPC ....................................... 705/7.32
See application file for complete search history.

(56) References Cited

U.S. PATENT DOCUMENTS

| 8,204,809 | B1 * | 6/2012 | Wise | ...................... G06Q 40/06 705/35 |
| 8,645,295 | B1 | 2/2014 | Dillard | |
| 8,731,995 | B2 * | 5/2014 | Sun | ......................... G06Q 10/10 704/9 |
| 2004/0143477 | A1 * | 7/2004 | Wolff | ............... G06Q 10/06316 705/7.26 |
| 2007/0156433 | A1 * | 7/2007 | Thorson | ................. G06Q 30/06 705/26.1 |
| 2009/0125352 | A1 * | 5/2009 | Miyake | .................. G06Q 10/06 705/7.15 |
| 2009/0144186 | A1 * | 6/2009 | Debarre | ................. G06Q 40/04 705/37 |
| 2010/0017250 | A1 * | 1/2010 | Bangs | .................... G06Q 10/06 705/7.12 |

(Continued)

FOREIGN PATENT DOCUMENTS

WO    WO-2006088546 A2 *  8/2006  ............. G06Q 30/02

OTHER PUBLICATIONS

Tucker et al., "Predicting Emerging Product Design Trend by Mining Publicly Available Customer Review Data," International Conference On Engineering Design (ICED11), Aug. 15-18, 2011, 10 pages, Technical University Of Denmark.

(Continued)

*Primary Examiner* — Romain Jeanty
(74) *Attorney, Agent, or Firm* — Erik K. Johnson (57) ABSTRACT

Embodiments of the present invention relate to a method, device and computer program product for product design based on user reviews. Reviews on a product are obtained from a plurality of users. These reviews are analyzed to determine sentiments of the users with respect to a property of the product. A plurality of candidate product designs are generated by changing a first value of the property based on the sentiments of the users. Then one or more new product designs are obtained based on the candidate product designs.

17 Claims, 5 Drawing Sheets

(56) References Cited

U.S. PATENT DOCUMENTS

2014/0188897 A1* 7/2014 Baker ................ G06Q 30/0631
707/748
2015/0161531 A1* 6/2015 Varshney .................. A61L 2/16
705/7.11
2016/0042460 A1* 2/2016 Hudak ................... G06Q 40/06
705/310

OTHER PUBLICATIONS

Zhang et al., "Self-service Product Innovation Based on Data Mining Technology," International Journal of Database Theory and Application, 2013, p. 105-118, vol. 6, No. 5, SERSC.

* cited by examiner

PRODUCT DESIGN BASED ON USER REVIEWS

BACKGROUND

The present invention relates generally to the field of computing, and more specifically, to product design.

Product design is a process of creating a new product to be sold to customers. It is essentially the generation and development of ideas through a process that leads to new products. Demand-pull innovation is an important category of product design which attempts to solve a problem(s) that has been found in an existing design or product. The design solution may be the development of a new product or improving a product that has already on the market, such as modifying one or more properties of the product.

For a given product category such as mobile phones, there are usually lots of new product designs emerging each year in order to meet the diverse user requirements. Each product design may be considered as a combination of various properties of the product. Examples of product properties include, but are not limited to, size, shape, color, price, brand, hardware/software configuration, and the like. In developing the product designs, the product designers and manufactures have to spend considerable costs to understand the desirable ways in which consumers wish they could use the product.

SUMMARY

In general, example embodiments of the present invention include a method, computer system, and computer program product for product design based on user reviews.

In an aspect, embodiments of the present invention provide a method for product design based on user reviews. The method comprises obtaining, from a first plurality of users, a first plurality of reviews on a first product. The first plurality of reviews are analyzed to determine sentiments of the first plurality of users based on a property of the first product. A first plurality of candidate product designs are then generated by changing a current value of the property based on the sentiments of the first plurality of users. The first plurality of candidate product designs are used to determine a new product design.

In another aspect, embodiments of the present invention provide a computer system for product design based on user reviews. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include obtaining from a first plurality of users, a first plurality of previews on a first product; determining sentiments of the first plurality of users based on a property of the first product by analyzing the first plurality of reviews; generating a first plurality of candidate product designs by changing a current value of the property based on the sentiments of the first plurality of users; and determining a new product design based on the first plurality of candidate product designs.

In another aspect, embodiments of the present invention provide a computer program product for product design based on user reviews. The computer program product may include one or more computer-readable storage devices and program instructions stored on at least one of the one or more tangible storage devices, the program instructions executable by a processor. The computer program product may include program instructions to obtain, from a first plurality of users, a first plurality of reviews on a first product; determine sentiments of the first plurality of users based on a property of the first product by analyzing the first plurality of reviews; generate a first plurality of candidate product designs by changing a current value of the property based on the sentiments of the first plurality of users; and determine a new product design based on the first plurality of candidate product designs.

It is to be understood that the Summary is not intended to identify key or essential features of embodiments of the present invention, nor is it intended to be used to limit the scope of the present invention. Other features of the present invention will become comprehensible through the description below.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
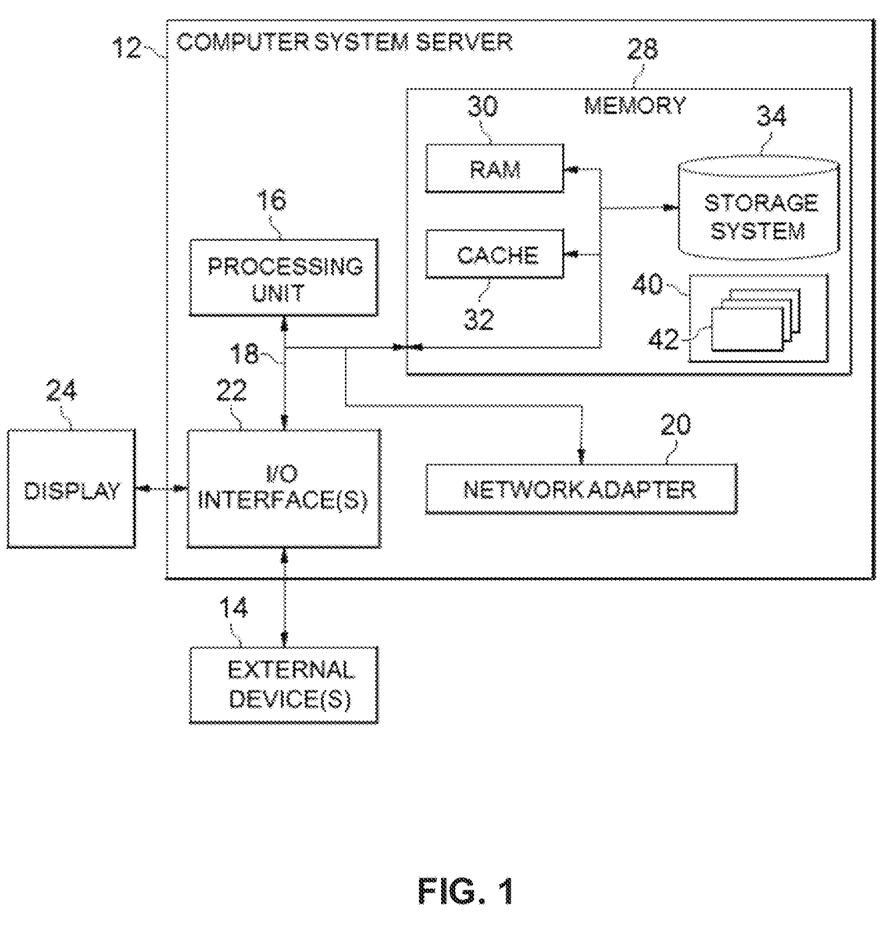
FIG. 1 is a block diagram of an electronic device in which embodiments of the present invention can be implemented.

Referring now to FIG. 1, an exemplary electronic device or computer system/server 12 which is applicable to implement the embodiments of the present invention is shown.

Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 may include different types of bus structures, such as a memory bus or memory controller, a peripheral bus, an accelerated graphics port, and a processor or local bus using different bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include computer system readable media. Such media may be available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. For example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 may generally carry out the functions and/or methodologies of embodiments of the invention as described herein.

Computer system/server 12 may also communicate with one or more external devices 14 such as a keyboard, a pointing device, and a display 24. One or more devices that enable a user to interact with computer system/server 12 may include devices such as a network card and a modem, and may enable computer system/server 12 to communicate with one or more other computing devices. Such communication can occur via input/output (I/O) interfaces 22. Furthermore, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples may include, but are not limited to: microcode, device drivers, redundant processing units, external disk drive arrays, RAID systems, tape drives, and data archival storage systems, and the like.

In computer system/server 12, I/O interfaces 22 may support one or more different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Some example embodiments of the product designs based on the user reviews are described in the following paragraphs. In general, in accordance with embodiments of the present invention, sentiment analysis is applied to process the user reviews on one or more products of a product category. In this way, the users' sentiments with respect to the current values or configurations of one or more properties of the products are determined. Such user sentiments are utilized to determine a plurality of candidate product designs. A candidate product design may be considered as a "virtual product" that is obtained by modifying the current values of the properties according to the users' sentiments. One or more new product designs are then determined based on the candidate product designs.

Figure 2:
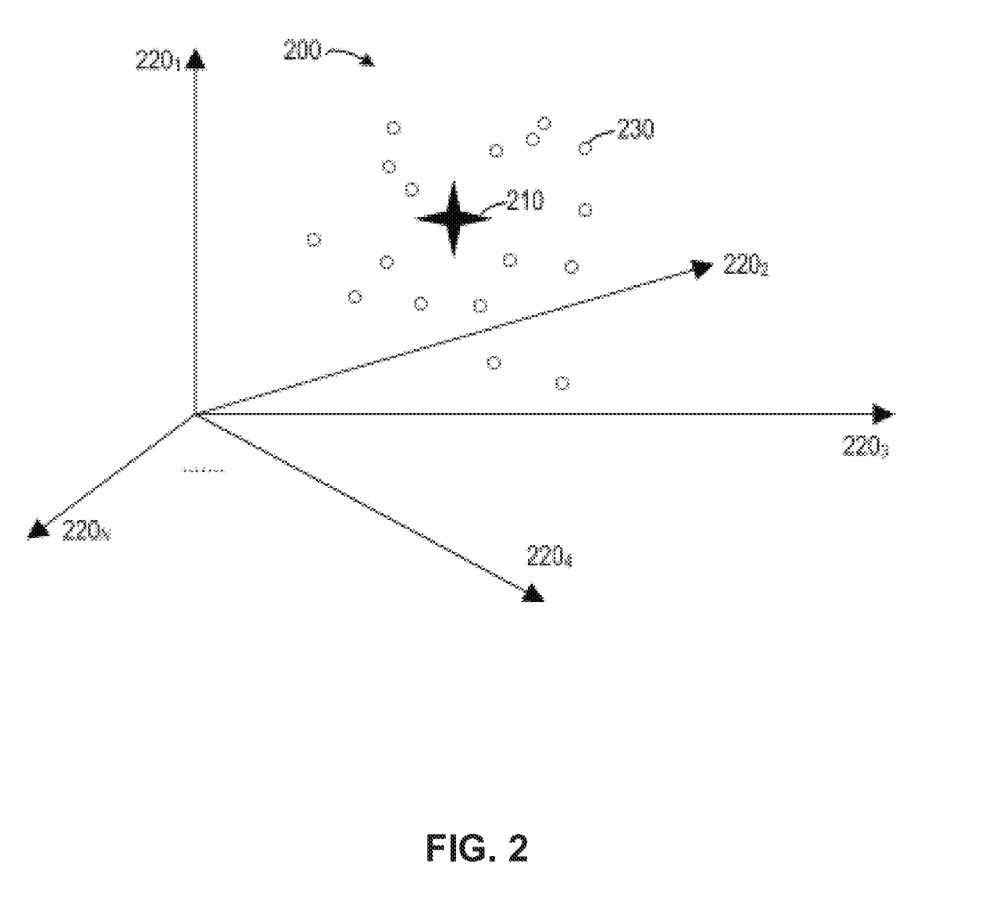
FIG. 2 is a schematic diagram illustrating the principle of operations of embodiments of the present invention.

Referring now to FIG. 2, a high-level schematic diagram illustrating the principle of operations of embodiments of the present invention is depicted. Products of a certain category have one or more properties to be considered in the design, as described above. For example, the properties to be considered in the design of mobile phones include, but are not limited to, screen size, battery lifetime, processing capability, storage capacity, camera resolution, price, and the like. For a given mobile phone, each of these properties have a certain value. Therefore, each kind of mobile phone may be represented as a vector $(v_1, v_2 \ldots v_N)$, where N represents the number of properties being considered, and $v_i$ (i=1, 2 . . . N) represents the value of the respective property. A multi-dimensional space 200 may be defined by axes $220_1$, $220_2$. . . $220_N$ (collectively referred to as axes "220") and correspond to the respective properties of the mobile phones, as shown in FIG. 2. In the multi-dimensional space 200, an example mobile phone may be represented as a point 210.

According to one implementation, the reviews on the product are collected from users. The users' reviews are used to determine the users' sentiment or attitude toward the current values of the properties 220. The values of the properties 220 are modified according to each user's sentiment. In this way, the modified values of the properties 220 define candidate product design or a virtual product which can be represented by a new point 230 in the multi-dimensional space 200, as shown in FIG. 2. By analyzing the reviews from multiple users, a plurality of virtual products and their corresponding points 230 may be generated. Based on the pattern of the points 230, one or more new designs may be obtained.

Figure 3:
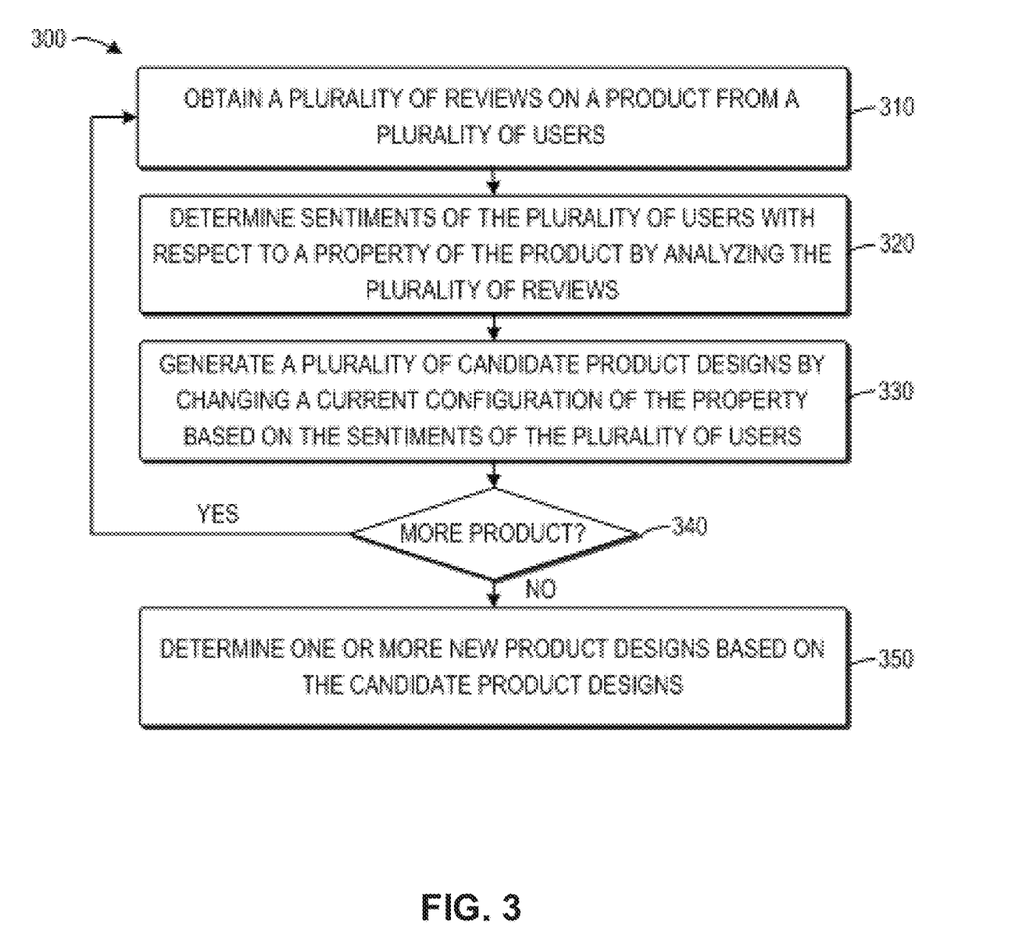
FIG. 3 is an operational flowchart illustrating the steps carried out by a program for determining new product design based on user reviews in accordance with embodiments of the present invention.

FIG. 3 shows an operational flowchart 300 of a method for determining a new product design based on the user reviews. At step 310, a plurality of reviews on a product are obtained from a plurality of users. The product is of the target product category to be analyzed. For example, the product may be an electronic device such as a mobile phone, a television, a portable computer or a shaver, machinery, a kitchen ware, or any other product.

Each review is made by a user and is related to the product or one or more properties thereof. In some embodiments, the reviews include textual comments provide by the users. For example, the manufactures or vendor of the product may allow the users to input textual comments concerning the product via a webpage or an application. Alternatively, or in addition, the reviews may include ranks or scores for the product that are given by the users. For example, the users may rank the product, such as from one-star to five-star, via a webpage or an application. Other forms of reviews are possible as well.

The user reviews may be obtained in a variety of ways. In some embodiments, the reviews may be automatically retrieved from a webpage, an application, a database and/or any other data source maintained by the designer, manufacturer or vendor of the product. Alternatively, or in addition, the reviews may be obtained at least in part manually. For example, in some embodiments, the reviews on the product may be obtained by consumer survey and questionnaire. Recognition technology such as OCR (optical characters recognition) may be used to digitalize the user reviews.

The, at step 320, sentiments of the plurality of users with respect to one or more properties of the product is determined. That is, for each user, it is determined in step 320 whether the user is satisfied with the current values of one or more properties 220 (FIG. 2) of the product. To this end, sentiment analysis is applied on each review to determine the sentiment of the user who makes the review with respect to the one or more properties 220 (FIG. 2) of the product.

Some reviews include ranks or scores for the product or one or more properties 220 (FIG. 2) thereof, as previously described in FIG. 2. Generally speaking, a high rank for a property 220 (FIG. 2) may indicate that the user is relatively satisfied with the property 220 (FIG. 2). On the other hand, a low score may indicate that the user is not very satisfied. For example, it is supposed that the users are allowed to rank the screen size of the mobile phone from one-star to five-star. If a user ranks the screen size a five-star, it means that the user thinks the current screen size is quite good for him/her. Otherwise, if another user ranks the screen size a two-star, it means that the user does not like the screen size.

For the textual comments provided by the users, the sentiment analysis process may utilize natural language processing, text analysis and computational linguistics to identify and extract subjective information contained in the comments with respect to one or more properties 220 (FIG. 2). Different approaches for sentiment analysis may be employed in step 320. For example, keyword spotting technology may be utilized to classify text by affect categories based on the presence of unambiguous affect words such as "good," "bad," "happy," and "like". Lexical affinity algorithms can be used to not only detect obvious affect words but also assign arbitrary words a probable "affinity" to particular emotions. Alternatively, or in addition, statistical methods may leverage on elements from machine learning such as latent semantic analysis, support vector machines, and "bag of words". More sophisticated methods apply deep parsing of the text to obtain grammatical relationships of words to mine the opinion in context and get the feature which has been opinionated. In some embodiments, unlike purely syntactical techniques, concept-level approaches leverage on elements from knowledge representation such as ontologies and semantic networks and thus are also able to detect semantics that are expressed in a subtle manner. For example, it is possible to analyze concepts that do not explicitly convey relevant information but are implicitly linked to other concepts that reflect the user's sentiment.

According to at least one embodiment, the sentiment analysis in step 320 may determine the direction in which a user expects a property to change. For example, if a user provides a comment "the screen is small," it can be determined by means of the sentiment analysis that the user prefers a screen size bigger than the current one. That is, the user is expecting the screen size to increase. As another example, if a user provides a comment "this phone is too expensive," it can be determined that the user is expecting a cheaper mobile phone. That is, the price is expected to drop.

In addition, or alternatively, the sentiment analysis in step 320 may determine the amount that a user expects a property to change. That is, the users' sentiments may be quantized. According to at least one embodiment, the relative amount of change of a property 220 (FIG. 2) as expected by the users may be determined. For example, if a user provides a comment "the screen is a bit small," it can be determined that the user prefers a screen size that is a little bit bigger than the current one. That is, the expected amount of increase of the screen size is relatively small. If the comment is "the screen is too small," it means that the user wants a phone with much bigger screen.

According to at least one embodiment, the ranks given by the users may be taken into account in determining the expected amount of change. Still considering the screen size as an example property 220 (FIG. 2), if the user provides a comment "the screen is small" while ranking the screen size a four-star, the sentiment analysis process may determine that the expected amount of change is relatively small. If another user provides the same comment but ranks a two-star, it can be determined that the user is expecting a relative significant increase of the screen size.

According to at least one embodiment, at step 320, the sentiment analysis process may determine the exact amount of change of a property 220 (FIG. 2) as expected by a user rather than the relative amount. For example, if a user provides a comment "it would be better if the screen is 1-inch bigger," it can be determined that the expected amount of change of the screen size is one inch. In other embodiments, given a comment like "I would like a 5.5-inch screen," the target value of a property 220 (FIG. 2) can be determined. Use of the quantized sentiments will be discussed in the following paragraphs.

Next, at step 330, a plurality of candidate product designs are generated based on the sentiments of the plurality of users. More particularly, the review from each user is used to generate a candidate product design. To this end, the current value of each property 220 (FIG. 2) of the product that is mentioned in the user's review is modified according to the user's sentiment as determined in step 320. For example, if the sentiment analysis indicates that the user wishes a bigger screen size, the value of screen size may be increased. As a result, a candidate product design or a "virtual product" is generated.

With reference to FIG. 2, if the value of a property 220 is increased, the point 210 corresponding to the product is moved along the positive direction of the axis representing that property 220. If the value of a property is decreased, the point 210 is moved along the negative direction of the axis representing that property 220. In this way, for each user review, the point 210 may be moved along the axis representing each property 220 mentioned in the review, thereby obtaining a new point 230. The new point 230 represents a candidate product design or a virtual product.

As previously described in FIG. 2, and according to at least one embodiment, the sentiment as determined in step 320 (FIG. 3) may include the exact expected change amount of a property. In such embodiments, the point 210 may be moved along the respective axis for that amount. For instance, in the above example where the expected screen sizes is 5.5 inch, the point 210 may be moved along the axis representing the screen size to a position that is corresponding to the expected 5.5 inch. Likewise, if the user provides a comment "hope the price can drop to 200 dollars," the point 210 may be moved along the negative direction of the axis representing the price to a position corresponding to 200 dollars.

According to a least one embodiment, the sentiment analysis can provide a relative emotional intensity of the user with respect to a property 220 (FIG. 2), without indicating the exact amount of change. In this case, the amount of change may be determined in different ways. According to at least on embodiment, the emotional intensity of the user may be divided to a plurality of levels such as "high," "intermediate," and "low." For example, the emotional intensity for the reviews "the screen is too small," "the screen is small," "the screen is a little bit small" may be set as "high," "intermediate," and "low," respectively. Each level is assigned with a predefined amount of change.

Alternatively, according to at least one embodiment, the sentiment analysis may quantize the sentiments of the users. The quantized sentiments may be associated with the values of a property 220 (FIG. 2) of the product by a predetermined function. Given the quantized sentiment, the change amount of the property 220 (FIG. 2) value or the expected property 220 (FIG. 2) value can be determined based on the predetermined function.

Figure 4A:
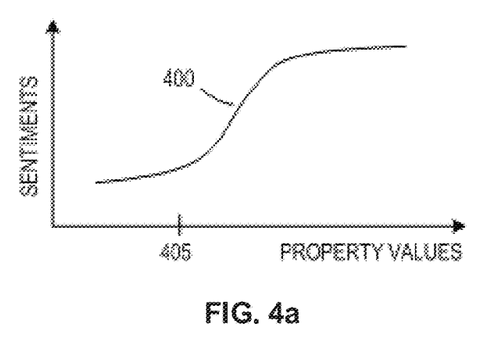
FIG. 4a-4d are schematic diagrams of functions that can be used to associate the quantized sentiments of the users and the values of a product property in accordance with embodiments of the present invention.

For example, in some embodiments, the quantized sentiments may be expressed as a continuous function of the property 220 (FIG. 2) values. Referring now to FIG. 4, more specifically to FIGS. 4a and 4b, diagrams of two example functions where the product is a mobile phone and the property 220 (FIG. 2) is the screen size are depicted. The function 400 as shown in FIG. 4a is expressed as follows:

$$f(x) = \frac{1}{1 - e^{-\alpha_1(x-A)}}$$

where $f(x)$ represents the quantized sentiment, x represents the expected value of the property 220 (FIG. 2), A represents the current value of the property 220 (FIG. 2) which is indicated by the point 405 in the figure, and $\alpha_1$ represents a coefficient that depends on the quantized sentiment. Given the quantized sentiment, $\alpha_1$ and A, the expected value x of the property 220 (FIG. 2) can be calculated. If the sentiment indicates that the user wants a bigger screen, the function 400 may be used, for example.

Figure 4B:
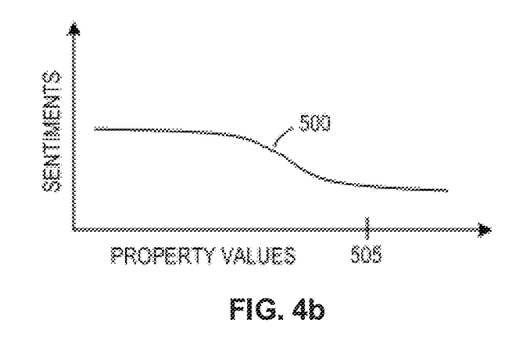

The function 500 as shown in FIG. 4b is expressed as follows:

$$f(x) = \frac{1}{1 - e^{\alpha_2(x-B)}}$$

where $f(x)$ represents the quantized sentiment, x represents the expected value of the property 220 (FIG. 2), B represents the current value of the property which is indicated by the point 505 in the figure, and $\alpha_2$ represents a coefficient that depends on the quantized sentiment. If the sentiment analysis indicates that the user wants a smaller screen, the function 500 may be used.

The functions 400 (FIG. 4a) and 500 (FIG. 4b) may both be monotonic functions. According to at least one embodiment, however, the sentiment merely indicates the user is satisfied or dissatisfied with the current value without suggesting whether the user expects to increase or decrease the current value of the property 220 (FIG. 2). For example, if the user ranks the screen size a two-star, the sentiment analysis can only determine that the user dislikes the current screen size. However, it cannot be determined whether the user prefers a bigger screen or a smaller one. To deal with this situation, in some embodiments, the non-monotonic functions may be used.

Figure 4C:
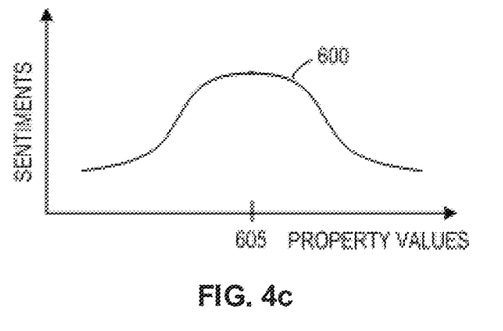
Figure 4D:
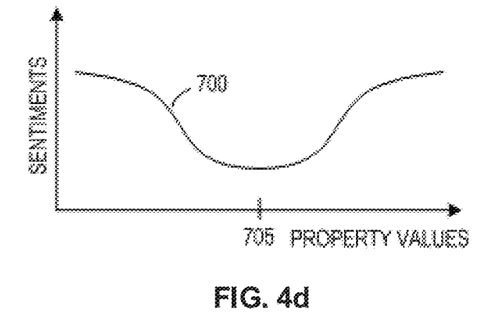

Referring now to FIGS. 4c and 4d diagrams of two example non-monotonic functions are depicted. The function 600 as shown in FIG. 4c is expressed as follows:

$$f(x, \mu, \sigma) = \frac{1}{\sigma\sqrt{2\pi}} e^{-\frac{(x-\mu)^2}{2\sigma^2}}$$

The function 700 as shown in FIG. 4d is expressed as follows:

$$f(x, \mu, \sigma) = 1 - \frac{1}{\sigma\sqrt{2\pi}} e^{-\frac{(x-\mu)^2}{2\sigma^2}}$$

where $\mu$, $\sigma$ a represent predefined coefficients. In FIGS. 4c and 4d, the points 605 and 705 each represent the current value of the property. If the user holds a positive evaluation on the current value of the property (that is, the quantized sentiment exceeds a predefined threshold), the function 600 may be used. If the user holds a negative evaluation on the current value, the function 700 may be used (that is, the quantized sentiment is below the predefined threshold).

It is to be understood that the functions described above with reference to FIGS. 4a-4d are merely examples, without suggesting any limitation as to the scope of the present invention. Different functions can be used. Such functions may be determined according to the user behavior analysis and modeling, statistics, experiences, marketing requirements, and the like. For example, according to at least one embodiment, piecewise functions rather than the continuous functions may be utilized to associate the quantized sentiments and the property values.

In reference to FIG. 3, the operational flowchart 300 proceeds to step 340 to determine whether there are more products to be analyzed. If so, the operational flowchart 300 returns to step 310 to repeat the process as described above. That is, according to at least one embodiment, the reviews concerning one or more other products that belong to the same product category as the product may be analyzed. For instance, if a first product that is analyzed previously is a mobile phone, a second product to be analyzed may be a mobile phone with different value and/or made by different manufacturers. It is to be understood that different products can be reviewed by same or different users. That is, it is supposed that the reviews concerning a first product are obtained from a first plurality of users and the reviews concerning a different second product are obtained from a second plurality of users. The first plurality of users may or may not be the same users as the second plurality of users. In this way, one or more further sets of candidate product designs may be obtained.

If it is determined in step 340 that no more products are to be analyzed, the operational flowchart 300 proceeds to step 350, where one or more new product designs are determined based on the plurality of candidate product designs obtained in step 330. It would be appreciated that if steps 310 to 330 are performed only once, then the new product design(s) is generated from a single product. If steps 310 to 330 are repeated multiple times, the new product design(s) is generated from multiple different products.

Figure 5:
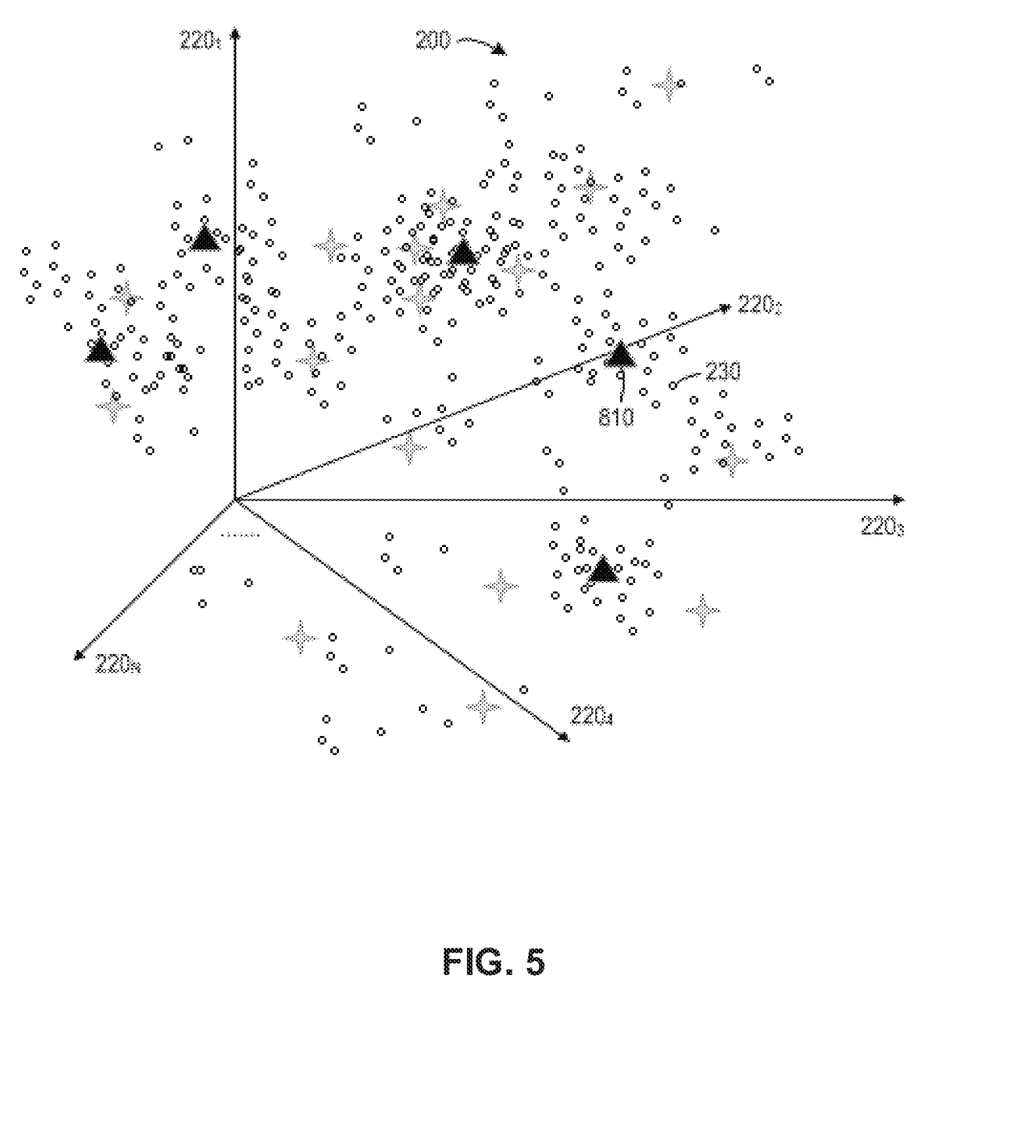
FIG. 5 is a schematic diagram illustrating the generation of new product designs by aggregating candidate product designs in accordance with embodiments of the present invention.

According to at least one embodiment, the new product design may be generated by aggregating the candidate product designs. For example, in the multi-dimensional space 200 as shown in FIG. 5, the reviews concerning a plurality of products (shown as starts) are analyzed. These products are of the same product category. By modifying the values of one or more properties 220 according to each user's sentiment, a plurality of candidate product designs 230 (shown as circles) are generated. The aggregation of these candidate product designs may be done by clustering them according to the similarity of the property 220 values of the candidate product designs. Different clustering algorithm, may be applied on the candidate product designs. Examples of the clustering algorithms include, but are not limited to, k-means algorithm, k-medoids algorithm, Clarans algorithm, Birch algorithm, Cure algorithm, Chameleon algorithm, and the like. Results of the clustering process may be considered as new product designs 810 (shown as triangles).

It is to be understood that aggregation of the candidate product designs in step 350 (FIG. 3) does not necessarily have to be done by clustering. For example, according to at least one embodiments, the candidate product designs may be coarsely divided into one or more groups according to the distances between the points representing the candidate product designs 230 (FIG. 5). Then a candidate product design may be selected from each group as the new product design. It would be appreciated that each group of candidate product designs may be represented by a point set. According to at least one embodiment, the candidate product design corresponding to the point located at or near the center of the point set may be selected. Alternatively, or in addition, the points representing the candidate product designs may be graphically presented to a user. The user may specify one or more candidate product designs to act as the new product designs. That is, in this embodiment, at least some of the new product designs are determined based on the user input.

By taking the users' sentiments into account, the new product design(s) 810 can better meet the user requirements. Specifically, as described above, the new product design(s) may be obtained by aggregating candidate product designs that are generated from different products (as shown in FIG. 5). Compared with the embodiment where all the candidate product designs are derived from only one product (as shown in FIG. 2), this would be beneficial since the pattern of the candidate product designs covers more product samples and thus more fully captures the user requirements. In this way, it is possible to obtain more meaningful new product designs.

The present invention may be a system, an apparatus, a device, a method, and/or a computer program product. The computer program product may include a computer readable storage medium (or media) having computer readable program instructions thereon for causing a processor to carry out aspects of the present invention. For example, processing unit 16 (FIG. 1) in computer system 12 (FIG. 1) may be configured to execute program instructions stored in memory 28 (FIG. 1) in order to implement the operational flowchart 300 (FIG. 3).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   using optical character recognition (OCR) technology associated with a virtual product interface to receive a first plurality of reviews associated with a first product, wherein the first product is a computer-generated virtual product, wherein the first plurality of reviews include text that is digitalized and captured by the OCR technology;
   based on the received first plurality of reviews, determining a plurality of sentiments associated with one or more values of a virtual product representation of the first product, wherein determining the plurality of sentiments of the plurality of users comprises quantizing the plurality of sentiments, and wherein the one or more values represent one or more properties, or configurations, of the first product;
   generating a plurality of different virtual product representations by adjusting the one or more values associated with the first product according to the determined plurality of quantized sentiments that are based on the first plurality of reviews, wherein the plurality of different virtual product representations represent a first plurality of candidate product designs based on the first product, and wherein each of the plurality of different virtual product representations comprises at least one adjusted value that corresponds to at least one adjusted property or configuration to the first product based on the determined plurality of quantized sentiments; and
   generating a new product design by aggregating the at least one adjusted value associated with each of the generated first plurality of candidate product designs.

2. The method of claim 1, wherein determining the plurality of sentiments associated with the one or more values of the virtual product representation comprises:
   determining a plurality of directions of the changing of the one or more values of the virtual product representation that are expected by the plurality of users.

3. The method of claim 1, wherein determining the plurality of sentiments associated with the one or more values of the virtual product representation comprises:
   determining an amount of the changing of the one or more values of the virtual product representation that are expected by the plurality of users.

4. The method of claim 1, wherein generating the first plurality of candidate product designs comprises changing the one or more values of the virtual product representation based on the quantized sentiments and a predetermined function that associates the quantized sentiments and the at least one adjusted value that corresponds to at least one adjusted property or configuration of the first product.

5. The method of claim 1, further comprising:
   receiving a second plurality of reviews, associated with a second plurality of users, on a second product, wherein the first product and the second product are based on a similar product category;
   determining a plurality of sentiments associated with the second plurality of users and based on a second property of the second product by analyzing the second plurality of reviews; and generating a second plurality of candidate product designs by changing a second value of the second property based on the plurality of sentiments associated with the second plurality of users.

6. The method of claim 5, wherein determining the new product design comprises:
aggregating the first plurality of candidate product designs and the second plurality of candidate product designs.

7. The method of claim 1, wherein receiving the first plurality of reviews comprises obtaining at least one a rank related to the one or more properties, or configurations, of the first product, and a textual comment related to the one or more properties, or configurations, of the first product.

8. The method of claim 1, wherein the first product is an electronic device, and wherein receiving the first plurality of reviews comprises obtaining a plurality of reviews related to the one or more properties, or configurations, of the first product that is selected from a group comprising a size of a screen, a color, a brand, a price, a hardware configuration and a software configuration associated with the electronic device.

9. A computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
using optical character recognition (OCR) technology associated with a virtual product interface to receive a first plurality of reviews associated with a first product, wherein the first product is a computer-generated virtual product, wherein the first plurality of reviews include text that is digitalized and captured by the OCR technology;
based on the received first plurality of reviews, determining a plurality of sentiments associated with one or more values of a virtual product representation of the first product, wherein determining the plurality of sentiments of the plurality of users comprises quantizing the plurality of sentiments, and wherein the one or more values represent one or more properties, or configurations, of the first product;
generating a plurality of different virtual product representations by adjusting the one or more values associated with the first product according to the determined plurality of quantized sentiments that are based on the first plurality of reviews, wherein the plurality of different virtual product representations represent a first plurality of candidate product designs based on the first product, and wherein each of the plurality of different virtual product representations comprises at least one adjusted value that corresponds to at least one adjusted property or configuration to the first product based on the determined plurality of quantized sentiments; and
generating a new product design by aggregating the at least one adjusted value associated with each of the generated first plurality of candidate product designs.

10. The computer system of claim 9, wherein the plurality of sentiments associated with the plurality of users based on the one or more properties, or configurations, of the first product comprises a plurality of directions of the changing of the one or more values of the virtual product representation that are expected by the plurality of users.

11. The computer system of claim 9, wherein the plurality of sentiments of the plurality of users based on the one or more properties, or configurations, of the first product comprises an amount of the changing of the one or more values of the virtual product representation that are expected by the plurality of users.

12. The computer system of claim 9, wherein generating the first plurality of candidate product designs comprises changing the one or more values of the virtual product representation based on the quantized sentiments and a predetermined function that associates the quantized sentiments and the at least one adjusted value that corresponds to at least one adjusted property or configuration of the first product.

13. The computer system of claim 9, wherein the acts further include:
receiving a second plurality of reviews, associated with a second plurality of users, on a second product, wherein the first product and the second product are based on a similar product category;
determining the plurality of sentiments associated with the second plurality of users and based on a second property of the second product by analyzing the second plurality of reviews; and
generating a second plurality of candidate product designs by changing a second value of the second property based on the plurality of sentiments associated with the second plurality of users.

14. The computer system of claim 13, wherein determining the new product design comprises:
aggregating the first plurality of candidate product designs and the second plurality of candidate product designs.

15. The computer system of claim 9, wherein receiving the first plurality of reviews comprises obtaining at least one a rank related to the one or more properties, or configurations, of the first product, and a textual comment related to the one or more properties, or configurations, of the first product.

16. The computer system of claim 9, wherein the first product is an electronic device, and wherein the one or more properties, or configurations, of the first product are selected from a group comprising a size of a screen, a color, a brand, a price, a hardware configuration and a software configuration associated with the electronic device.

17. A computer program product, comprising:
one or more computer-readable storage devices and program instructions stored on at least one of the one or more tangible storage devices, the program instructions executable by a processor, the program instructions comprising:
program instructions to use optical character recognition (OCR) technology associated with a virtual product interface to receive a first plurality of reviews associated with a first product, wherein the first product is a computer-generated virtual product, wherein the first plurality of reviews include text that is digitalized and captured by the OCR technology;
based on the received first plurality of reviews, program instructions to determine a plurality of sentiments associated with one or more values of a virtual product representation of the first product, wherein the program instructions to determine the plurality of sentiments of the plurality of users comprises program instructions to quantize the plurality of sentiments, and wherein the one or more values represent one or more properties, or configurations, of the first product;

program instructions to generate a plurality of different virtual product representations by adjusting the one or more values associated with the first product according to the determined plurality of quantized sentiments that are based on the first plurality of reviews, wherein the plurality of different virtual product representations represent a first plurality of candidate product designs based on the first product, and wherein each of the plurality of different virtual product representations comprises at least one adjusted value that corresponds to at least one adjusted property or configuration to the first product based on the determined plurality of quantized sentiments; and program instructions to generate a new product design by aggregating the at least one adjusted value associated with each of the generated first plurality of candidate product designs.

* * * * *